R. R. JONES.
Axle Nut-Fastenings.
No. 147,646.
Patented Feb. 17, 1874.
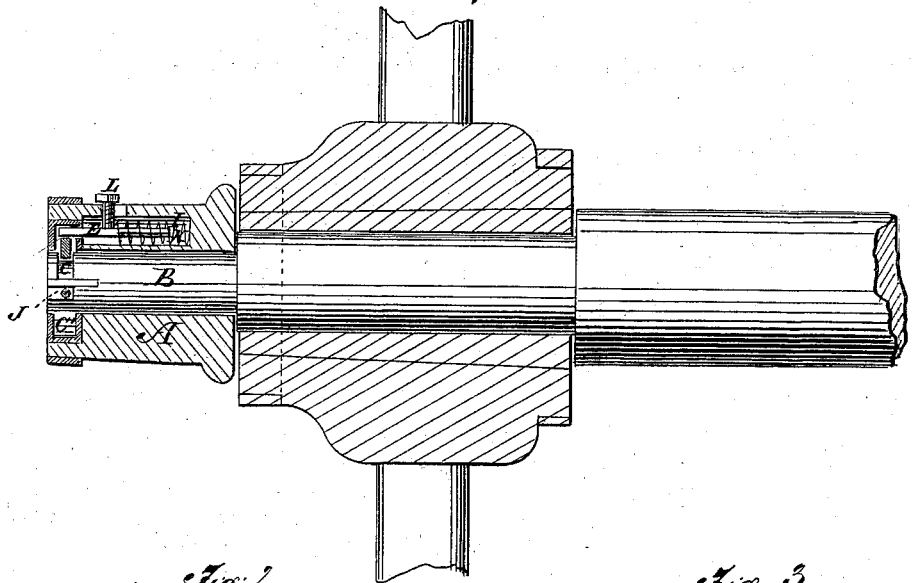
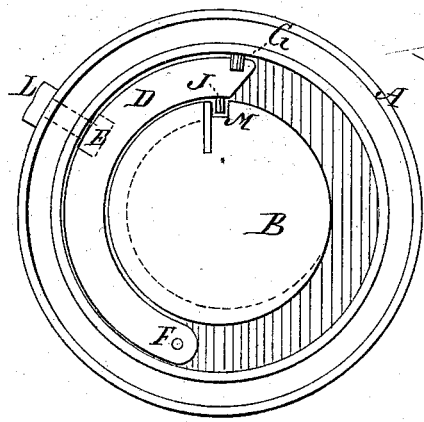
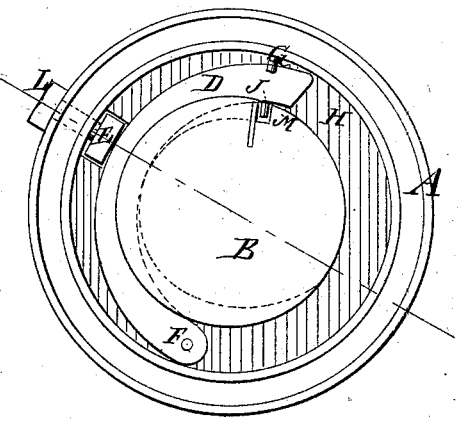
Witnesses:
Inventor:
R. R. Jones
Per
Attorneys.

UNITED STATES PATENT OFFICE.

ROLLA R. JONES, OF PILLAR POINT, NEW YORK.

IMPROVEMENT IN AXLE-NUT FASTENINGS.

Specification forming part of Letters Patent No. 147,646, dated February 17, 1874; application filed November 15, 1873.

*To all whom it may concern:*

Be it known that I, ROLLA R. JONES, of Pillar Point, in the county of Jefferson and State of New York, have invented a new and Improved Axle-Nut Fastening, of which the following is a specification:

My invention consists of a circumferential groove, extending about half around the axle near the end, a pawl in a recess in the bore of the nut, adapted to fall into said groove when the nut is fitted on the axle, and a slide-bolt in the nut, adapted to slide over the pawl by the action of a spring, after it has fallen into the groove, and lock it fast, all so that no screw-threads are needed, and the nut is fastened more securely than it can be by screwing on.

Figure 1 is a longitudinal section of a wheel-hub and nut, the latter being arranged according to my invention, the section being taken on the line $x\ x$ of Fig. 3. Fig. 2 is a cross-section, showing the position of the pawl and locking-bolt when the nut is put in position on the axle; and Fig. 3 is a cross-section, showing the positions when the nut is fastened on the axle.

Similar letters of reference indicate corresponding parts.

A is the threadless nut; B, the smooth extension of the axle on which the nut is fitted. C is the groove in the said extension of the axle, near the end. D is the pawl on the nut for engaging the axle in the groove C, and E is the locking-slide for fastening the pawl in said groove. The pawl is a small metal bar in the form of half a ring, or thereabout. It is pivoted at one end, F, in an annular groove, C', in the interior of the bore of the hub, which is in the same plane that the groove C is when the nut is in position. The other end of the pawl is free to swing up and down on the pivot F; but it is confined laterally between the stud-pin G and the side H of the groove. The locking-slide E is arranged in a hole, I, in the hub, parallel with the central bore, so as to slide forward over the pawl when it has fallen into the groove C, and it is provided with a spring, K, to force it forward and hold it. It is also provided with a thumb-stud, L, for pushing it back when the nut is to be taken off. Said thumb-stud projects out a little beyond the outside surface of the hub through a slot, which allows it to be shoved forward and back, and said slot has a notch at one side, at the inner end, to hold the locking-slide back, when it is desirable to do so, for taking the nut off. The pawl has a stud-pin, J, on the inner edge, which enters a little notch, M, in the axle when the nut is put on, which insures the dropping of the pawl into groove C by holding the free end of the pawl when the nut is turned a little to the left, after being put on the axle, and it forces said pawl out of the groove when the nut is turned the other way.

Having thus described my invention, I claim as new and desire to secure by Letters Patent—

The combination of the threadless nut A, spring-pawl D F, having pin J, lock-slide E L, and grooved axle-extension B C, as and for the purpose specified.

ROLLA R. JONES.

Witnesses:
E. S. CLARK,
F. D. PIERCE.